Jan. 26, 1954
P. DURAND
2,667,080
CHANGE-SPEED GEAR
Filed March 7, 1951
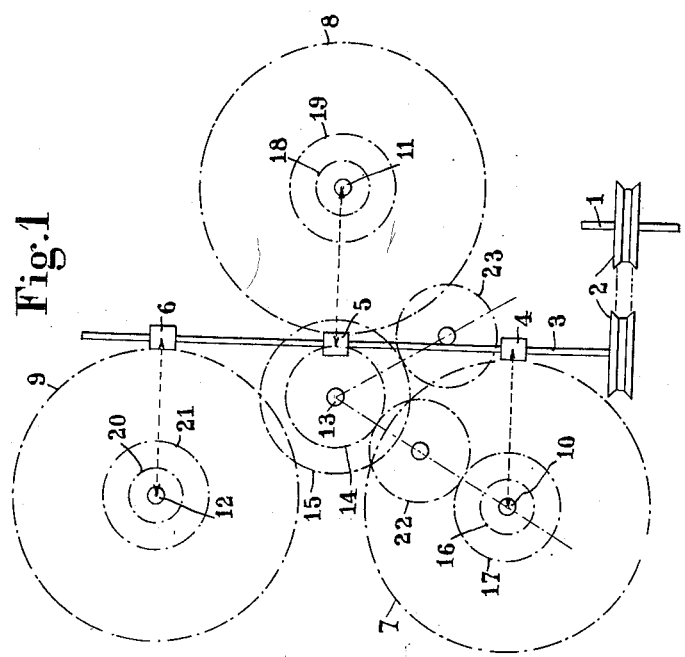
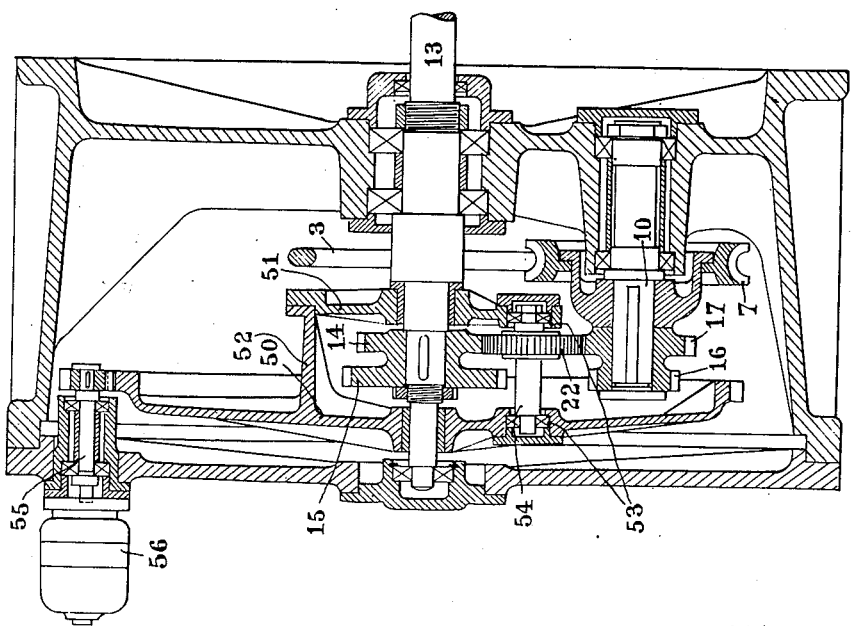
INVENTOR:
PAUL DURAND
BY:

Patented Jan. 26, 1954

2,667,080

UNITED STATES PATENT OFFICE 2,667,080

CHANGE-SPEED GEAR

Paul Durand, Paris, France

Application March 7, 1951, Serial No. 214,348

Claims priority, application France March 13, 1950

4 Claims. (Cl. 74—353)

This invention relates to change-speed gears and more particularly to a change-speed gear utilizing the property of worm gearings whereby a considerable reduction ratio can be obtained through a single worm-and-wheel gearing between an input shaft and an output shaft in comparison to gear trains or variable-speed devices which provide but a relatively small speed reduction.

The change-speed gear according to this invention operates as follows: It selects through worm gearings definite portions of the speed range and in each selected portion gear-trains or variable-speed devices of the continuous type provide the desired speed gradation in the selected range. The selection of the speed ranges may be so effected that the combination of worm gearings and gear-trains or variable-speed devices will cover without discontinuity either a relatively extensive fraction of the complete range of speeds or, on the contrary, a plurality of restricted yet totally different portions of the range of speeds.

According to a characteristic feature of the invention, the input shaft of the arrangement actuates a plurality of worm gearings and wormwheels, and each wormwheel is adapted to drive the output shaft separately and independently of the other wormwheels either directly or through the intermediary of other transmission members, the velocity ratios between the input shaft and the output shaft being so choosen that according to the reducing gears used in the transmission the speed at which the output shaft is driven will pertain to definitely different portions of the range of speeds.

According to another characteristic feature of the invention interchangeable gear trains or variable-speed devices are interposed between the input and output shafts so that for each reducing gear the output shaft will rotate at gradated or gradually varying speeds comprised between those obtained with the next lower and upper reducing gears of the transmission.

With the characteristic features set forth above it is therefore possible to construct change-speed gearboxes of the most diversified shapes providing very extensive ranges of speeds.

Reference will now be made to the affixed drawings forming part of this specification and illustrating diagrammatically by way of example some practical embodiments of the invention.

In the drawings:

Fig. 1 shows an embodiment of a change-speed gear according to the invention.

Fig. 2 illustrates in cross-sectional view the details of a complete practical embodiment of the apparatus shown in Fig. 1.

Referring first to the arrangement illustrated in Fig. 1, an input shaft 1 is connected to a countershaft 3 through a variable-speed device 2 providing a continuous and progressive speed-varying action; the countershaft 3 carries a number of worms, for instance three worms 4, 5, 6 in the embodiment shown. Each worm meshes with a wormwheel 7, 8, 9 rigid with shafts 10, 11, 12 respectively. The axes of these shafts intersect at right angles the plane of the figure at the vertices of an equilateral triangle. The axis of the output shaft 13 of the arrangement is coincident with the orthocenter of the triangle and parallel with and equidistant from the shafts 10, 11, 12. The output shaft 13 carries a pair of toothed wheels 14, 15 and each shaft 10, 11, 12 carries a pair of toothed wheels having different diameters, the pairs of wheels being identical however. Thus, shaft 10 has two wheels 16, 17, shaft 11 two wheels 18, 19 and shaft 12 two wheels 20, 21. A supporting member rotatably mounted on the output shaft 13 carries two toothed wheels 22, 23 which, according to the angular position of the supporting member about the axis of shaft 13, may be brought into meshing engagement with the different wheels described above. Thus, according to the position of the supporting member, wheel 22 may connect wheel 14 of the output shaft with either of wheels 17, 19 or 21 of shafts 10, 11, 12 respectively. Similarly, wheel 23 may be caused to connect wheel 15 of the output shaft with either of wheels 16, 18 or 20 of shafts 10, 11, 12 respectively. Assuming that the reduction ratios of the three worm gearings fitted in the change-speed gear are 1:1, 1:9 and 1:81 respectively, that wheels 14, 17, 19, 21 have the same diameter and provide a reduction ratio of 1:1, that the diameter of wheel 15 is three times that of wheels 16, 18, 20 corresponding to a transmission ratio of 1:3, and finally that the variable-speed device is adapted to provide a continuous variation of the speed within a 1:3 ratio, it will be possible, according to the worm gearings used in the transmission and to the transmission wheels set in meshing engagement, to obtain in the output shaft velocity ratios varying gradually between two limit values corresponding to the extreme positions of the variable-speed device. The following table indicates the various ratios set forth above and (see last column on the right)

the final velocity ratios resulting in the output shaft:

| Worm gearing ratios | Transmission wheel ratios | Upper and lowermost ratios of variable speed device | Input-to-output final ratios |
|---|---|---|---|
| 1:1 | 1:1 | 1:1 | 1:1 |
| 1:1 | 1:1 | 1:3 | 1:3 |
| 1:1 | 1:3 | 1:1 | 1:3 |
| 1:1 | 1:3 | 1:3 | 1:9 |
| 1:9 | 1:1 | 1:1 | 1:9 |
| 1:9 | 1:1 | 1:3 | 1:27 |
| 1:9 | 1:3 | 1:1 | 1:27 |
| 1:9 | 1:3 | 1:3 | 1:81 |
| 1:81 | 1:1 | 1:1 | 1:81 |
| 1:81 | 1:1 | 1:3 | 1:243 |
| 1:81 | 1:3 | 1:1 | 1:243 |
| 1:81 | 1:3 | 1:3 | 1:729 |

With the example described it is therefore possible to obtain any desired velocity ratios between 1:1 and 1:729 in a progressive manner. Of course, other ratios could be obtained by modifying the separate ratios of the worm gearings, transmission wheels and variable-speed devices. Thus, if the separate velocity ratios are 1, $b^2$, $b^4$ for the worm gearings, 1 and $a$ for the transmission wheels, $c$ being the ratio between the limit speeds given by the variable-speed device, the output shaft will be driven with reduction ratios varying continuously between 1 and $ab^2c$.

Fig. 2 illustrates in cross-sectional view the details of a complete practical embodiment of the form of apparatus shown in Fig. 1, the members already visible in this latter figure bearing the same reference numbers. As in Fig. 1, Fig. 2 shows the change-speed gear in the position thereof corresponding to the connection of wheel 14 of output shaft 13, through wheel 22 carried by the rotary supporting member round the output shaft 13, with wheel 17 rigid with shaft 10. This rotary supporting member consists of a pair of disks 50 and 51 mounted for loose rotation on the output shaft 13 on either side of the pair of wheels 14, 15 carried thereby; besides, disk 50 is formed with an axial extension 52 rigid with disk 51. Both disks 50, 51 are formed with suitable seats 53 having fitted thereon adequate bearings in which are mounted the end portions of a shaft 54 carrying the aforesaid intermediate wheel 22, as well as other identical seats (not shown) containing similar bearings having mounted therein the ends of a shaft rigid with another wheel 23 meshing with wheel 15 of output shaft 13 and wheels 16, 18 and 20 (only wheel 16 is shown in Fig. 2, but the arrangement of the other wheels mentioned herein will be readily understood by reference to Fig. 1).

Disk 50 has a greater diameter than disk 51 and is formed at its periphery with a set of teeth in meshing engagement with a pinion carried by a shaft 55 driven by an auxiliary motor 56 whereby the latter when energised will cause disks 50, 51 to rotate about shaft 13 and therefore either of wheels 22 or 23 to be moved into different useful positions for connecting wheel 14 or wheel 15 of the output shaft with one of wheels 17, 19, 21 or 16, 18, 20. In this connection it must be pointed out that the sectional view constituting Fig. 2 of the drawings shows only wheels 16 and 17 with their shaft 10 but it will be readily understood that shafts 11 and 12 of wheels 18, 19 and 20, 21 are mounted in the change-speed gear casing in the same fashion as shaft 10.

Of course, many modifications may be brought to the embodiments shown and described herein, which are merely examples given for illustrative purpose, without departing from the spirit and scope of the invention.

What I claim is:

1. Change-speed gear comprising an input shaft and an output shaft, a plurality of worms carried by said input shaft, an equivalent number of worm wheels carried by shafts parallel with, and positioned at equal intervals from said output shaft, each of said worm wheels meshing with one of said worms, said worm wheels and worms being so arranged that each worm-and-wheel gearing constituted thereby will act as a speed reducing gearing and that the respective speeds of said worm wheels will lie in definitely different portions of the speed range, at least one series of equally-dimensioned toothed pinions each carried in a common plane by the shaft of a corresponding worm wheel, a toothed pinion carried by said output shaft and registering with said series of pinions and in the common plane of the said series, a supporting member rotatably and coaxially mounted on said output shaft, a toothed pinion carried by said supporting member and registering with said series of pinions and in the same plane as the said series, the diameter of said pinion carried by said supporting member being such that it can simultaneously mesh on the one hand with said pinion carried by said output shaft and corresponding to said series of pinions, and on the other hand with that pinion of said same series which is carried by any one of said shafts of said worm wheels, except pinions of the same series but carried by the shafts of other worm wheels, according to the position given to said rotary supporting member whereby the latter will enable said output shaft to be driven through one worm-and-wheel reducing gearing but not through the other.

2. Change-speed gear according to claim 1 wherein the projections of the geometrical axes of said worm wheels on a plane at right angles to said axes form the vertices of an equilateral polygon the center of which consists of the projection of the axis of said output shaft on said plane.

3. Change-speed gear according to claim 1 wherein the arrangement includes three worms carried by said input shaft, also three worm wheels in meshing engagement with said worms, and wherein the projections of the three axes of said worm wheels on a plane at right angles to said axes constitute the three vertices of an equilateral triangle, whilst the projection of said output shaft on the same plane is coincident with the intersection of the three heights of the aforesaid triangle.

4. Change-speed gear according to claim 1 comprising in addition a continuous infinitely-variable speed gearing which drives the input shaft.

PAUL DURAND.

References Cited in the file of this patent

UNITED STATES PATENTS

| Number | Name | Date |
|---|---|---|
| 1,930,791 | Donley | Oct. 17, 1933 |
| 2,159,207 | Godfriaux | May 23, 1939 |
| 2,376,917 | Hiltz | May 29, 1945 |

FOREIGN PATENTS

| Number | Country | Date |
|---|---|---|
| 41,526 | Denmark | Jan. 14, 1930 |